(12) United States Patent
Yusa et al.

(10) Patent No.: US 7,625,514 B2
(45) Date of Patent: Dec. 1, 2009

(54) METHOD FOR MODIFYING POLYMER SURFACE AND METHOD FOR PRODUCING POLYMER PRODUCT

(75) Inventors: Atsushi Yusa, Toride (JP); Masahiro Oshima, Otsu (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 614 days.

(21) Appl. No.: 11/111,822

(22) Filed: Apr. 22, 2005

(65) Prior Publication Data

US 2005/0240004 A1   Oct. 27, 2005

(30) Foreign Application Priority Data

Apr. 26, 2004   (JP) ............... 2004-129235

(51) Int. Cl.
*B29C 45/00* (2006.01)
(52) U.S. Cl. ............... 264/328.17; 264/233; 264/328.7; 264/50; 427/282; 427/256
(58) Field of Classification Search ............. 264/77, 264/136, 135, 293, 301, 343, 500, 517; 427/225.6, 427/248.1, 901, 90, 256, 282, 286
See application file for complete search history.

(56) References Cited

U.S. PATENT DOCUMENTS

| | | | | |
|---|---|---|---|---|
| 4,207,049 A | * | 6/1980 | Malo et al. ............... 425/129.1 |
| 4,861,385 A | * | 8/1989 | Yagishita ............... 134/10 |
| 5,308,648 A | | 5/1994 | Prince et al. |
| 6,627,246 B2 | * | 9/2003 | Mehta et al. ............... 427/2.1 |
| 6,676,867 B2 | | 1/2004 | Tsuchiya et al. |
| 2003/0228485 A1 | * | 12/2003 | Yusa et al. ............... 428/577 |
| 2004/0109952 A1 | * | 6/2004 | Jagannathan et al. ......... 427/458 |
| 2004/0145086 A1 | * | 7/2004 | Yusa ..................... 264/328.11 |

FOREIGN PATENT DOCUMENTS

| | | |
|---|---|---|
| JP | A 10-128783 | 5/1998 |
| JP | A 2001-226874 | 8/2001 |
| JP | A 2002-129464 | 5/2002 |
| JP | A-2004-508177 | 3/2004 |

OTHER PUBLICATIONS

S. Sicardi et al., "Diffusion of Disperse Dyes in PET Films During Impregnation with a Supercritical Fluid", Journal of Supercritical Fluids 17 (2000), pp. 187-194.

* cited by examiner

*Primary Examiner*—Christina Johnson
*Assistant Examiner*—Galen Hauth
(74) *Attorney, Agent, or Firm*—Oliff & Berridge, PLC (57) ABSTRACT

A method for modifying a surface of a polymer such as a thermoplastic resin is provided, in which a supercritical fluid, especially carbon dioxide in a supercritical state is used as a solvent, and the polymer surface is further converted to have highly advanced function or high performance in a short period of time. In the method for modifying the polymer surface of the present invention, a solute is previously applied to the polymer surface. Accordingly, the solute can be permeated into the surface of the polymer swelled by the contact of the supercritical fluid. When this method is used, it is possible to permeate the solute into the polymer at a high concentration in a short period of time.

21 Claims, 5 Drawing Sheets

METHOD FOR MODIFYING POLYMER SURFACE AND METHOD FOR PRODUCING POLYMER PRODUCT

BACKGROUND OF THE INVENTION

1. Field of the Invention

The present invention relates to a method for modifying a polymer surface and a method for producing a polymer product. In particular, the present invention relates to a method for modifying a polymer surface and a method for producing a polymer product based on the use of a supercritical fluid.

2. Description of the Related Art

In recent years, various processes have been suggested, in which a resin is formed and processed by using a supercritical fluid which has permeability like a gas and which functions as a solvent like a liquid. For example, Japanese Patent Application Laid-open No. 10-128783 suggests the following method. That is, the supercritical fluid is permeated into a thermoplastic resin, and thus the supercritical fluid functions as a plasticizer to successfully lower the viscosity of the resin. Therefore, this action of the supercritical fluid is utilized to improve the fluidity and the transfer performance of the resin upon the injection molding.

Various methods have been also suggested to realize highly advanced functions or high performance, in which the function of the supercritical fluid as the solvent is utilized to improve, for example, the wettability of the polymer surface. For example, Japanese Patent Application Laid-open No. 2001-226874 discloses the fact that the fiber surface can be made hydrophilic by dissolving polyalkyl glycol in the supercritical fluid to make contact with the fiber. Japanese Patent Application Laid-open No. 2002-129464 discloses a batch process for realizing a highly advanced function of a polymer surface, in which a polymer is allowed to make contact with a supercritical fluid in which a solute as a functional material has been previously dissolved, in a supercritical state, i.e., at a high pressure to perform a dyeing.

However, as a result of diligent investigations performed by the present inventors, it has been revealed that the following problems arise in the method for modifying the polymer surface in which the supercritical fluid is used as the solvent as described above.

At first, the polymer is swelled such that the supercritical fluid, which functions as the plasticizer, is allowed to make contact with the entire polymer surface. Therefore, when the thickness of the polymer is thick, the interior of the polymer tends to be foamed. Further, when the supercritical fluid makes contact with the polymer, the glass transition temperature (Tg) of the polymer is lowered. Therefore, the polymer is deformed, and it is difficult to maintain the shape accuracy. For this reason, it is difficult that the method for modifying the polymer surface as described above is applied to polymers other than a polymer such as a film or a fiber in which the thickness is thin and the cross-sectional area is small. Therefore, the way of use has been limited. When a polymer having a thick thickness is used, it is possible to suppress the foaming phenomenon in the polymer and the sudden decrease in the glass transition temperature of the polymer by making the pressure-reducing speed for the supercritical fluid to be extremely slow. However, the throughput is deteriorated. Therefore, the merit of the use of this method is lost.

The solubility as a solvent of the supercritical fluid, especially of carbon dioxide in the supercritical state is equivalent to that of n-hexane. For example, even when an entrainer is used as an auxiliary, it is not approved that the solubility of a solute in the supercritical fluid is sufficient. In other words, the ratio of the permeation of the functional agent as the solute into the polymer is smaller than the ratio of the permeation of the supercritical fluid such as the supercritical carbon dioxide into the polymer. Therefore, the concentration of the solute permeated into the polymer is extremely low. For this reason, it has been necessary that the supercritical fluid containing the solute is allowed to make contact with the polymer for at least 10 to 30 minutes.

Further, there is a strong correlation between the pressure of the supercritical fluid and the solubility of the solute. When the vessel, which is allowed to have a high pressure by filling with the supercritical fluid, is released or opened, then the pressure in the vessel is suddenly reduced in a batch process for modifying the polymer surface, and the solubility of the solute is extremely lowered. Therefore, the solute is consequently deposited during the reduction of the pressure. When the vessel is allowed to have a high pressure again, the internal pressure of the vessel is restored in a relatively short period of time, while the solute, which has been once deposited, is not necessarily dissolved immediately in the polymer again. Accordingly, a problem arises, for example, such that the piping of the apparatus to be used for the batch process is clogged with the deposited solute. In this case, it is difficult to recover the solute in a powdery state in order to use the solute as the functional agent again, in which the cost is expensive as well. Further, it is necessary to provide a mixing tank for uniformly or homogeneously dissolving the solute in the supercritical fluid at a predetermined concentration. The apparatus itself is expensive.

Further, the conventional batch process is a process for modifying the entire polymer surface. Until now, there has been no report on any process in which a part of a polymer surface is modified selectively and finely.

SUMMARY OF THE INVENTION

The present invention has been made in order to solve the problems as described above, a first object of which is to provide a method for modifying a surface of a polymer such as a thermoplastic resin by using a supercritical fluid, especially carbon dioxide in a supercritical state as a solvent, wherein the polymer surface is converted to have a highly advanced function or high performance in a short period of time. A second object of the present invention is to provide a method for modifying a surface by allowing a supercritical fluid to make contact with only a part of the polymer surface so that a fine pattern is formed on the polymer surface, while selectively permeating a solute into only a pattern formation portion.

According to a first aspect of the present invention, there is provided a method for modifying a surface of a polymer with a supercritical fluid, the method comprising:

applying a solute to the surface of the polymer; and bringing the supercritical fluid into contact with the surface of the polymer to which the solute has been applied so that the solute is permeated into the surface of the polymer.

According to the method for modifying the polymer surface of the present invention, the solute can be permeated into the surface of the polymer swelled by the contact of the supercritical fluid by previously applying the solute to the polymer surface. When this method is used, the problem, in which the solute is deposited during the reduction of the pressure of the supercritical fluid, is not caused as compared with the conventional method described above, i.e., the method wherein the supercritical fluid, in which the solute has been previously dissolved is made contact with the polymer. Accordingly, the piping of the apparatus to be used for the batch process is not clogged with the solute unlike the conventional method described above. Thus, the solute can be permeated into the polymer at a high concentration in a short period of time. Further, the solute can be recovered as in a powdery state, and it can be reused as a functional agent. Additionally, it is unnecessary to provide any mixing tank with which the solute is dissolved constantly at a predetermined concentration in the supercritical fluid. Therefore, the process is simplified, and it is possible to lower the cost required to modify the polymer surface.

In the method for modifying the polymer surface of the present invention, the polymer may be subjected to press forming by using a mold while bringing the supercritical fluid into contact with the polymer surface. A predetermined pattern may be formed by the press forming on the polymer surface to which the solute has been applied. When the supercritical fluid makes contact with the polymer, then the supercritical fluid functions as a plasticizer, and the polymer surface is softened. The press forming can be performed in this state by using the mold. Accordingly, it is possible to obtain the polymer on which a precise pattern is formed on the polymer surface while modifying the polymer surface. Even when the mold temperature is lower than the glass transition temperature of the polymer, it is possible to transfer the precise pattern to the polymer surface.

A space, which is defined between the mold and the polymer before being pressed in the press forming, may have a pressure which is lower than a pressure of the supercritical fluid, and a space, which is defined between the mold and the polymer after being pressed in the press forming, may have a pressure which is not less than the pressure of the supercritical fluid. By doing so, it is possible that the pressure of the supercritical fluid to be introduced into the mold is suppressed to be low. It is unnecessary to separately provide any hole or the like in order to introduce the supercritical fluid into the recess on the surface of the mold. It is possible to partially apply the surface-modifying treatment even when the polymer, which has a fine pattern difficult to be formed and processed, is formed.

The supercritical fluid may be flown into a space which is defined between the mold and the polymer after putting a surface of the mold into tight contact with the polymer surface in the press forming and the polymer is further pressed. In this way, the supercritical fluid, which is in such a state that the pressure is stabilized, is successfully allowed to make contact with the gap between the polymer and the mold for a desired period of time. Therefore, it is possible to apply the fine and partial modifying treatment to the polymer surface.

Further, the solute, which remains on the polymer surface, may be washed with a solvent. By doing so, it is possible to obtain the polymer in which only a part of the polymer surface is selectively modified.

A concave/convex pattern, which has a depth of not more than 100 μm, more desirably not more than 50 μm, and much more desirably not more than 10 μm, may be provided on a surface of the mold. If the difference between concave and convex portions exceeds 10 μm, then it is relatively difficult to suppress the foaming on the convex portion formed on the polymer surface, and any additional operation is required, for example, such that the mold temperature is raised after the pressure reduction to perform the forming again. On the contrary, when foamed portions are intentionally provided at only convex portions formed on the polymer surface, no problem arises even when the difference between concave and convex portions is not less than 100 μm.

In the method for modifying the polymer surface according to the present invention, the supercritical fluid may be carbon dioxide in a supercritical state (supercritical carbon dioxide). The supercritical carbon dioxide has actual achievements as a plasticizer for the thermoplastic material in the injection molding and the extrusion molding. Materials also usable as the supercritical fluid include, for example, air, water, butane, pentane, and methanol in the supercritical state. In particular, any material is arbitrarily usable provided that the material is a fluid which has solubility to some extent with respect to organic materials. It is also allowable to mix acetone or alcohol such as methanol, ethanol, and propanol as an entrainer, i.e., as an auxiliary in the supercritical fluid.

In the present invention, a polymethyl methacrylate resin may be used as the polymer. It is also allowable to use, as the polymer, various thermoplastic resins including, for example, polycarbonate, polyamide, polyetherimide, polyamideimide, polyester, polyacetal, polymethylpentene, amorphous polyolefine, polytetrafluoroethylene, liquid crystal polymer, styrenic resin, polymethylpentene, polyacetal, materials obtained by mixing a plurality of the compounds as described above, polymer alloy containing a main component of the compound as described above, and materials obtained by blending various fillers to the compounds or materials as described above.

In the present invention, materials dissolvable in the supercritical fluid may be used as the solute. The solute as described above is permeated into the polymer in such a form that the solute is dissolved in the supercritical fluid. Therefore, the solute is permeated into the polymer with ease. Polyethylene glycol is permeated into the polymer relatively easily, because it is dissolvable, for example, in supercritical carbon dioxide. Further, polyethylene glycol makes it possible to obtain the polymer with the surface which is made hydrophilic, because it has the hydrophilic group (OH). Therefore, these features of polyethylene glycol are preferred. When the hydrophilic property is provided by using polyethylene glycol which is excellent in biocompatibility, polymer products such as biochips and μ-TAS (micro total analysis system) are preferably produced. For example, it is possible to obtain an effect to suppress the adhesion of nucleic acids or proteins to the surface of the polymer as a hydrophobic material, and it is possible to separate nucleic acids depending on the hydrophobic coefficient thereof by making division in hydrophilic-hydrophobic minute areas on the polymer surface. It is possible to arbitrarily use, as the solute, various organic materials and inorganic materials modified with organic compounds, especially materials dissolvable in the supercritical fluid to some extent. The inorganic materials as described above include, for example, metal alkoxide and organic metal complexes. For example, when an organic dye material such as azo-based dyes, fluorescent dyes, and phthalocyanine is used as the solute, the polymer surface can be stained. For example, when polyethylene glycol or polypropylene glycol is used as the solute, it is possible to make the polymer hydrophilic. When a hydrophobic ultraviolet stabilizing agent such as benzophenone and coumarin is used, it is possible to improve the tensile strength of the polymer after the weathering. When a fluorine compound such as fluorinated organic copper complexes is used as the solute, then it is possible to improve the friction performance of the polymer, and/or it is possible to provide the water-repelling function. When silicon oil is used as the solute, the water-repelling function is also expressed. When an organic metal complex is used as the solute, the polymer can be used as catalyst nuclei for the electroless plating.

In the present invention, it is also possible to use, as the solute, a material which is not dissolvable in the supercritical fluid. The polymer is swelled in accordance with the contact of the supercritical fluid with the polymer surface. In this situation, the solute, which has been applied onto the polymer and which is not dissolvable in the supercritical fluid, is permeated into the polymer owing to the pressure of the supercritical fluid. In this procedure, arbitrary materials may be used as the solute. However, it is desirable to use a material especially having a molecular weight of not more than 5,000, considering the size of the particles of the solute which is easily permeable into the polymer. The inorganic material, which satisfies the condition as described above, includes, for example, metal fine particles, nanocarbon such as carbon nanotube, fullerene and nanohorn, and titanium oxide. In the case of the conventional method, only the solute, which is dissolvable in the supercritical fluid, could be used. However, in the present invention, it is also possible to modify the surface by using the solute which is not dissolvable in the supercritical fluid, owing to the function as described above.

In the present invention, the solute, which is previously softened by being heated, may be applied to the polymer surface by using a solute-applying apparatus. However, when the material, which is used as the solute, is in a form of liquid, a film may be formed on the polymer surface by using any means such as the dipping and the printing. The solute, which is usable in this procedure, includes, for example, polyalkyl glycol and silicon oil. Only the solute can be formed as a film by scattering the solvent by using the spin coat method after the solute, which is dissolved in the solvent, is applied onto the polymer surface. For example, various dyes or metal complexes can be formed as films on the polymer surface, for example, such that the various dyes and the metal complexes, which are dissolved in acetone or alcohol, are applied onto the polymer surface, and then acetone or alcohol is scattered by using the spin coat method. The solute may be formed as a film on the polymer surface by using the sputtering or the vapor deposition method.

In the present invention, arbitrary conditions may be used, for example, for the temperature and the pressure of the supercritical fluid to make contact with the polymer. However, for example, in the case of carbon dioxide having such threshold values to provide the supercritical state that the temperature is about 31° C. and the pressure is not less than about 7 MPa, the temperature may be within a range of 35 to 150° C., and the pressure may be within a range of 10 to 25 MPa. If the temperature exceeds 150° C. and/or the pressure exceeds 25 MPa, then it is difficult to maintain the tight sealing in the mold, and it is difficult to control the opening/closing of the valve. On the other hand, if the temperature and the pressure are less than the ranges described above, then the solute is insufficiently dissolved in the supercritical fluid, and the solute is insufficiently permeated into the polymer.

In the present invention, the polymer surface can be easily modified by using the supercritical fluid such as supercritical carbon dioxide in the secondary processing for the polymer such as formed resin products. The function is continued, because the solute, which expresses the function, is permeated into the polymer. Therefore, it is possible to provide the functional polymer which is excellent in the weather resistance. It is also possible to modify the surface selectively and finely for only a part of the convex portion or the like formed on the polymer surface.

According to a second aspect of the present invention, there is provided a method for producing a polymer product by using a supercritical fluid, the method comprising:

preparing a polymer;
applying a solute to a surface of the polymer; and
bringing the supercritical fluid into contact with the surface of the polymer to which the solute has been applied so that the solute is permeated into the surface of the polymer.

In the method for producing the polymer product according to the present invention, the polymer may be subjected to press forming by using a mold while bringing the supercritical fluid into contact with the polymer surface.

In the method for producing the polymer product according to the present invention, the polymer product may be a biochip or μ-TAS.

DESCRIPTION OF THE PREFERRED EMBODIMENTS

An explanation will be made below with reference to the drawings about embodiments concerning the method for modifying the polymer surface according to the present invention. However, the present invention is not limited thereto.

First Embodiment

Forming Apparatus Used for Surface-modifying Method

Figure 1:
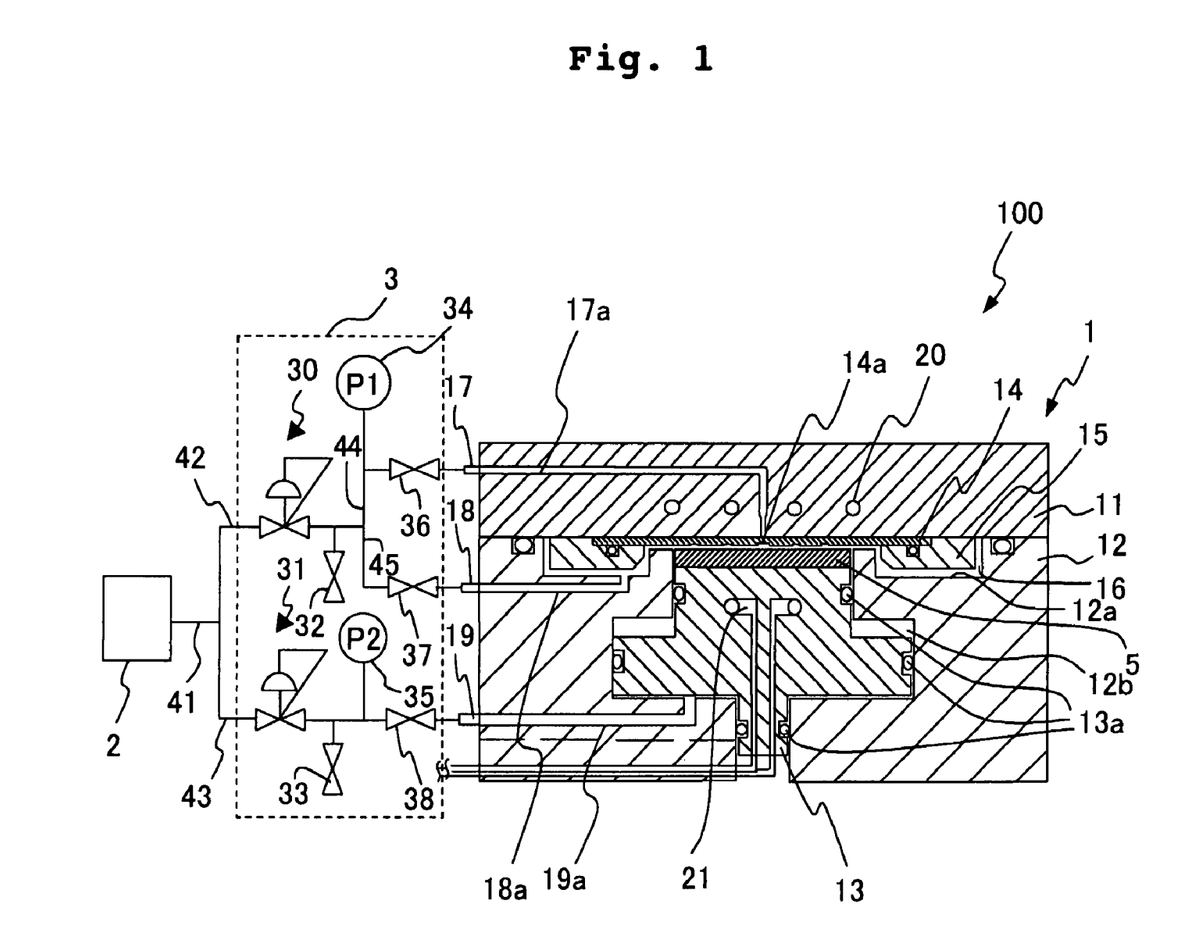
FIG. 1 shows a schematic arrangement of a mold and a forming apparatus to be used for a surface-modifying method according to the present invention.
Figure 2:
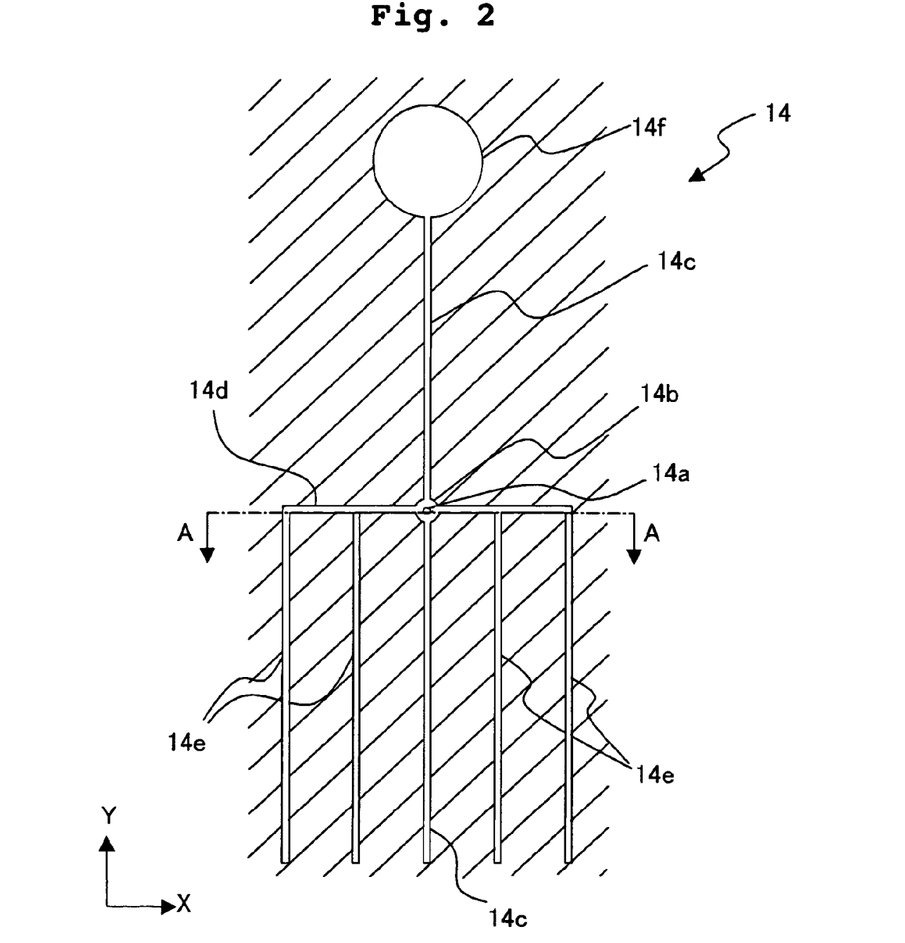
FIG. 2 shows a top view illustrating a stamper used in an embodiment of the present invention.
Figure 3:
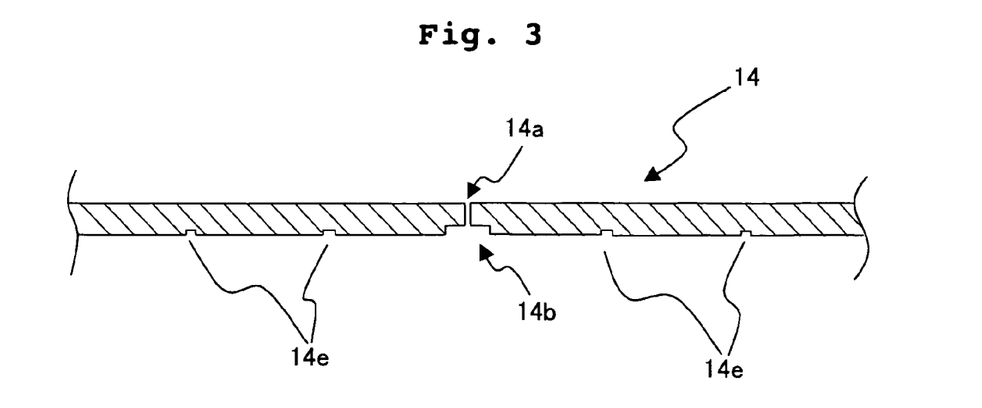
FIG. 3 shows a sectional view taken along a line A-A illustrating the stamper shown in FIG. 2.

At first, an explanation will be made with reference to FIGS. 1 to 3 about a forming apparatus to be used for the method for modifying the surface according to the present invention. FIG. 1 shows a schematic arrangement illustrating the forming apparatus to be used for the method for modifying the surface according to the present invention. The forming apparatus 100 principally comprises a mold 1 which is provided with a clamping unit (press piston), a supercritical fluid-generating unit 2, and a pressure-reducing unit 3 which is provided to adjust the pressure of the supercritical fluid to be introduced into the mold 1.

The mold 1 principally includes, an upper mold 11, a lower mold 12, a press piston 13, and a stamper 14. The stamper 14, which has a concave/convex pattern provided on the surface, is fixed on the lower surface of the upper mold 11 so that the surface, on which the concave/convex pattern is formed, is directed in the direction toward the lower mold 12. A stamper holder 15 is used to fix the stamper 14. The stamper 14 is fixed such that the outer circumferential portion of the stamper 14 is forcibly pressed against the lower surface of the upper mold 11. A recess 12a is formed at a position opposed to the stamper holder 15 on the upper surface of the lower mold 12.

When the lower surface of the upper mold 11 and the upper surface of the lower mold 12 are allowed to make contact with each other, a space 16 is defined in the mold 1. The recess 12a of the lower mold 12 has its outer portion which is formed to be low by a certain difference in height so as not to cause any interference with the stamper holder 15 when the upper mold 11 and the lower mold 12 are allowed to make contact with each other. The lower mold 12 has a hollow section (cylinder) 12b which ranges from the upper surface recess 12a to the lower surface of the lower mold 12. The press piston 13, which is movable upwardly and downwardly with respect to the upper mold 11, is provided in the hollow section 12b. A plurality of O-rings 13a, which make contact with the inner wall of the hollow section 12b, are provided on the outer circumference of the press piston 13. Accordingly, the press piston 13 can make the upward and downward movement while tightly closing or sealing the space 16 defined in the mold 1. The press piston 13 makes the upward and downward movement by using the supercritical fluid generated by the supercritical fluid-generating unit 2. A method for controlling the press piston 13 will be described later on.

The upper mold 11 has an inlet port 17 which is provided on the side surface thereof in order to introduce the supercritical fluid into the mold 1. A flow passage 17a, which is used to allow the supercritical fluid to inflow, is provided from the inlet port 17 to a central portion of the lower surface of the upper mold 11. An opening portion of the flow passage 17a, which is disposed on the side of the lower surface of the upper mold 11, is communicated with an introducing hole 14a provided for the stamper 14 as described later on. An inlet port 18, which is used to introduce the supercritical fluid into the mold 1, is provided on the side surface of the lower mold 12. A flow passage 18a, which is used to introduce the supercritical fluid, is provided from the inlet port 18 to the recess 12a of the lower mold 12, especially the portion of the recess 12a which is lowered by a certain difference in height. Accordingly, the supercritical fluid, which is produced by the supercritical fluid-generating unit 2, can be efficiently introduced into the space 16 defined in the mold 1. Further, the lower mold 12 has an inlet port 19 which is provided on the side surface of the lower mold 12 in order to introduce the supercritical fluid into the hollow section 12b of the lower mold 12. A flow passage 19a, which is used to allow the supercritical fluid to inflow, is provided from an inlet port 19 to the hollow section 12b. An opening portion of the flow passage 19a, which is disposed on the side of the hollow section, is communicated with the space defined by the plurality of O-rings 13a provided for the press piston 13 as described above. Accordingly, the supercritical fluid, which is introduced from the inlet port 19 via the flow passage 19a into the hollow section 12b, does not leak to any one of the outside of the mold 1 and the space 16 defined in the mold 1.

The shape of the stamper 14 of this embodiment is as follows. FIG. 2 shows a top view illustrating the stamper 14, and FIG. 3 shows a sectional view taken along a line A-A in relation to the top view. A rectangular stamper made of nickel having a thickness of 1 mm was used as the stamper 14. The pattern, which is formed on the surface of the stamper 14 used in this embodiment, is a pattern to evaluate the state of the modified surface of the polymer as described later on. The evaluating pattern was formed to provide the following shape. As shown in FIGS. 2 and 3, the introducing hole 14a, which is used to introduce the supercritical fluid, is provided at a central portion of the stamper 14. The introducing hole 14a had a diameter of 0.4 mm. Grooves 14c, 14d, which have a width of 0.1 mm and which extend in a predetermined direction (referred to as "X direction") and a direction (referred to as "Y direction") perpendicular to the predetermined direction (X direction) respectively with the center of the introducing hole 14a, are formed on the surface of the stamper 14. The grooves 14c, 14d had lengths of 20 mm and 4 mm respectively. A circular recess 14f, which has a diameter of 10 mm, is formed at the end of the groove 14c in the +Y direction. A plurality of grooves 14e, which extend in parallel to the groove 14c, are formed in the −Y direction from the groove 14d. Two of the grooves 14e are formed symmetrically on the both sides of the groove 14c respectively in the +X direction and the −X direction at intervals of 1 mm. Each of the grooves 14e has a length of 10 mm and a width of 0.1 mm. The depths of the grooves 14c, 14d, 14e and the depth of the circular recess 14f are all 30 µm. Additionally, a circular recess 14b having a diameter of 1.0 mm, which ranges from the surface of the formation of the grooves (pattern) to a depth of 30 µm, is formed at an intersecting portion between the groove 14c and the groove 14d, while it is considered that the supercritical fluid is also sufficiently spread to the inner portions of the grooves which form the pattern.

With reference to FIG. 1 again, the supercritical fluid-generating unit 2 is principally composed of a booster pump. The pressure-reducing unit 3 principally comprises pressure-reducing valves 30, 31, release valves 32, 33, pressure gauges 34 (to indicate the pressure value P1), 35 (to indicate the pressure value P2), and valves 36, 37, 38. The supercritical fluid-generating unit 2 is connected to the pressure-reducing unit 3 via a piping 41. The supercritical fluid, which is produced by the supercritical fluid-generating unit 2, is supplied to the pressure-reducing unit 3. The piping 41 is branched into pipings 42, 43. The piping 42 is further branched into two pipings 44, 45 via the pressure-reducing valve 30 and the release valve 32 which is provided in order that the interior of the mold 1 is open to atmospheric air. In particular, the branched piping 44 is connected to the inlet port 17 of the upper mold 11 via the pressure gauge 34 and the valve 36. The branched piping 45 is connected to the inlet port 18 of the lower mold 12 via the valve 37. On the other hand, the piping 43 is connected to the inlet port 19 of the lower mold 12 via the pressure-reducing valve 31, the release valve 33, the pressure gauge 35, and the valve 38.

Method for Modifying Polymer Surface

Next, an explanation will be made with reference to FIGS. 1 and 4 about a method for modifying the polymer surface by using the forming apparatus described above. In this embodiment, in order to evaluate the state of modification of the polymer surface, a concave/convex pattern was formed on the surface of the polymer 5 by using the stamper 14 formed with the evaluating pattern as shown in FIG. 2.

At first, polyethylene glycol (PEG), which had been heated to 60° C. and softened beforehand, was applied, as the solute, onto a surface of a polymer composed of polymethyl methacrylate resin (trade name: Delpet 560F produced by Asahi Kasei Chemicals Corporation) having a glass transition temperature Tg of about 100° C. Polyethylene glycol (PEG) had a molecular weight of 1,000. Subsequently, the applied surface was made smooth by using a squeegee. Accordingly, the polymer, on which the solute had been applied onto the surface beforehand, was obtained. Subsequently, as shown in FIG. 1, the polymer 5, to which the solute had been applied, was installed to the upper surface of the press piston 13 of the mold 1, and the upper mold 11 and the lower mold 12 were tightened with bolts to tightly close the interior of the mold 1 thereby.

Figure 4A:
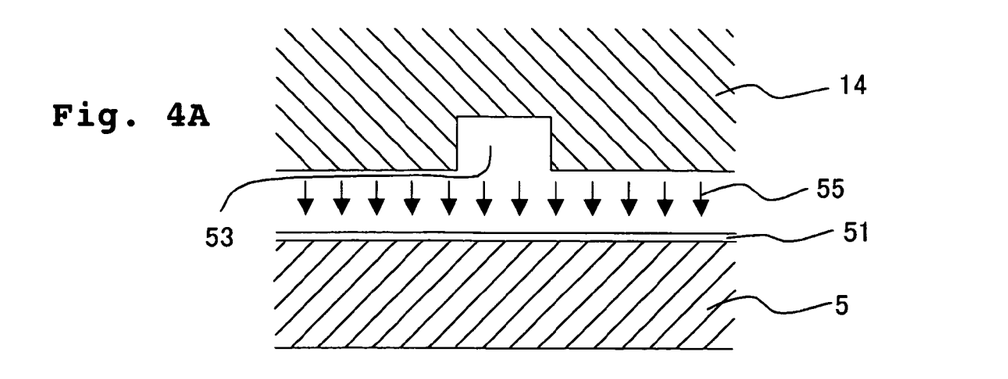
FIGS. 4A to 4D illustrate a method for modifying a polymer surface according to a first embodiment of the present invention.

Subsequently, the supercritical fluid was introduced into the space 16 in the mold 1 as follows. In this embodiment, carbon dioxide in the supercritical state (supercritical carbon dioxide) was used as the supercritical fluid. The supercritical carbon dioxide having a temperature of 50° C. and a pressure of 25 MPa, which was produced by the supercritical fluid-generating unit 2, was allowed to have a pressure P1=20 MPa by adjusting the pressure-reducing valve 30 of the pressure-reducing unit 3. After the pressure P1 of the supercritical carbon dioxide 55 was stabilized, the state was maintained for 3 minutes. Subsequently, the valve 36 was opened. Accordingly, the pressure-adjusted supercritical carbon dioxide was introduced into the space 16 defined in the mold 1 via the inlet port 17 of the upper mold 11, the flow passage 17*a*, and the introducing hole 14*a* of the stamper 14 by opening the valve 36, and the supercritical carbon dioxide was allowed to stay therein (FIG. 4A). Simultaneously, the valve 37 was opened, and thus the supercritical carbon dioxide was introduced into the space 16 in the mold 1 via the inlet port 18 of the lower mold 1*b* and the flow passage 18*a*. In this procedure, the distance was 1 mm between the surface of the polymer 5 and the surface of the stamper 14 on the side formed with the pattern. In the mold 1, temperature controllers (for example, temperature controllers of the hot water circulation type) 20, 21, which are installed in the upper mold 11 and the press piston 13, can be used to control the temperatures of the surface of the upper mold 11 and the surface of the press piston 13. When the supercritical fluid makes contact with the temperature-controlled mold, the temperature and the pressure thereof are changed. However, the temperature and the pressure conditions of the supercritical fluid in this embodiment are illustrative of the state established before being introduced into the mold.

Figure 4B:
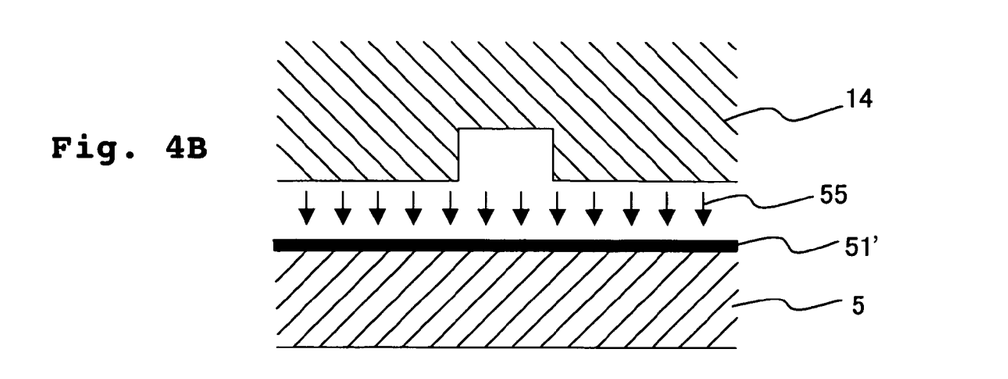
Figure 4C:
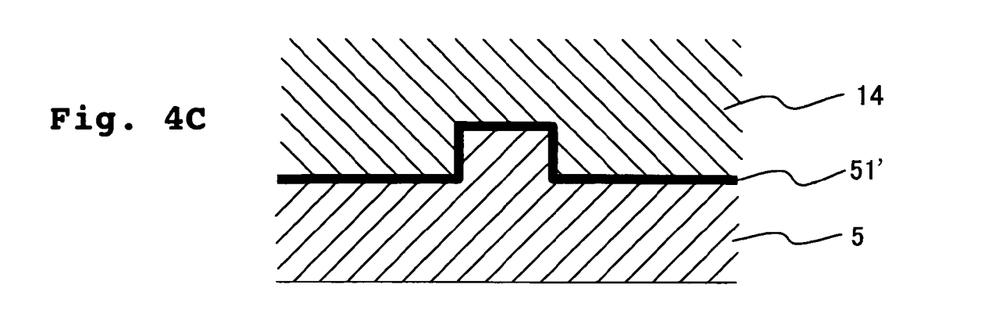

As shown in FIG. 4B, when the supercritical carbon dioxide 55 makes contact with the entire surface of the polymer 5 via the solute 51, then the polymer 5 is swelled, the viscosity of the polymer 5 is lowered, and the polymer 5 is softened. Simultaneously, the solute 51, which is applied to the surface of the polymer 5, is dissolved in the supercritical carbon dioxide 55, and the solute 51 is permeated into the surface of the polymer 5 together with the supercritical carbon dioxide 55 (solute-permeated layer 51'). Subsequently, as shown in FIG. 4C, the press piston (13, see FIG. 1) was moved upwardly to press the polymer 5. As shown in FIG. 1, the press piston 13 is moved upwardly and downwardly by controlling the pressure of the supercritical carbon dioxide to be introduced by using the pressure-reducing unit 3. The press piston 13 was controlled as follows. That is, the press piston 13 was moved by introducing the supercritical carbon dioxide adjusted to have a pressure P2=20 MPa by using the pressure-reducing unit 3. The pressure was raised to a predetermined press pressure, and then this state was maintained for 2 minutes. It is enough that the press pressure of the press piston 13 is a pressure capable of competing the pressure of the carbon dioxide which stays at the interface between the polymer 5, and the stamper 14 and the mold 1.

Figure 4D:
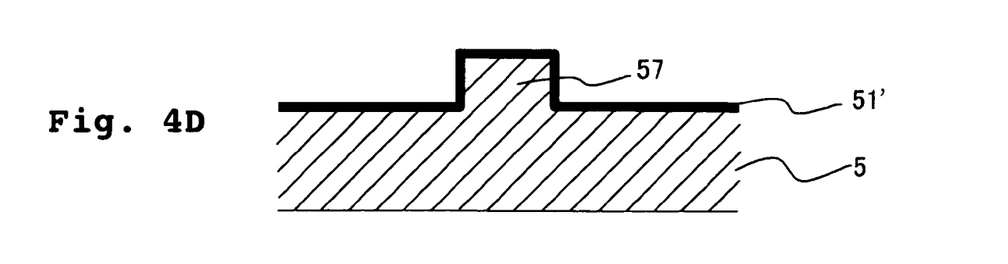

Subsequently, the release valve 32 shown in FIG. 1 was opened, and thus the space in the mold 1 was open to the atmospheric air. Further, the release valve 33 was opened, and thus the press pressure of the press piston 13 was reduced to move the press piston 13 backwardly. Subsequently, the formed polymer 5 was taken out from the mold 1. Further, the entire polymer 5 was ultrasonically washed for 10 minutes in a methanol solution. Accordingly, as shown in FIG. 4D, the polymer 5 can be obtained, wherein a concave/convex pattern 57, which corresponds to the concave/convex pattern 53 of the stamper 14, is formed on the polymer surface, simultaneously with which the solute is permeated into the entire surface. The concave/convex pattern 53 corresponds to the pattern of the groove 14*c* formed on the stamper 14 shown in FIG. 2. The solute is permeated into the polymer at a high concentration. Therefore, it is possible to allow the polymer surface to have the highly advanced function or high performance. In this embodiment, polyethylene glycol is used as the solute. Therefore, the surface of the obtained polymethyl methacrylate resin is made hydrophilic.

The wettability of the surface of the obtained polymer 5 was confirmed by allowing water droplets to fall thereon. As a result, the contact angle of water before the surface-modifying treatment was about 65°, while the contact angle of water after the treatment was about 10°. It has been revealed that the wettability is greatly improved. When the wettability was confirmed again after immersing the polymer after the treatment in water for 24 hours, the contact angle of water was scarcely changed. When the wettability was confirmed after leaving the polymer after the treatment in the atmospheric air for 1 month, the contact angle of water was 15°. It has been revealed that the good wettability is maintained for a certain period of time.

Second Embodiment

An explanation will be made with reference to FIGS. 1 and 5 about a method for modifying a polymer surface by selectively permeating a solute into only a part of the polymer surface. The method was carried out in the same manner as in the first embodiment described above principally except that the initial pressure of the supercritical carbon dioxide to be introduced into the space defined in the mold and the timing for press-forming the polymer were changed.

Figure 5A:
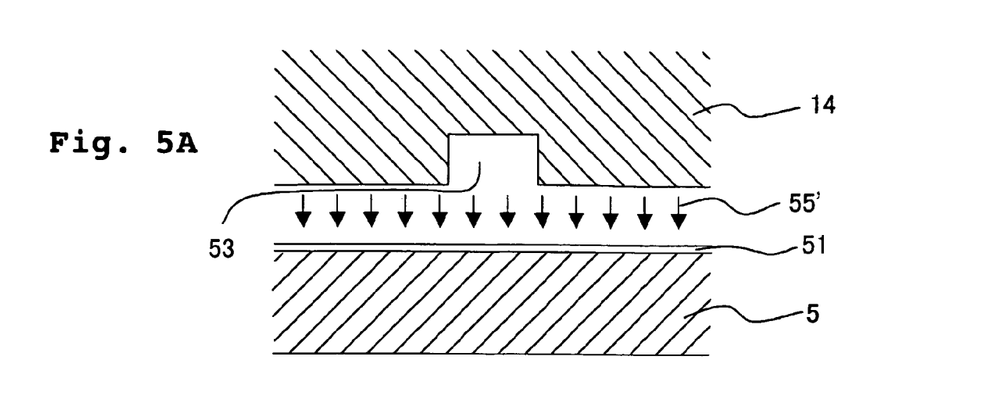
FIGS. 5A to 5D illustrate a method for modifying a polymer surface according to a second embodiment of the present invention.
Figure 5B:
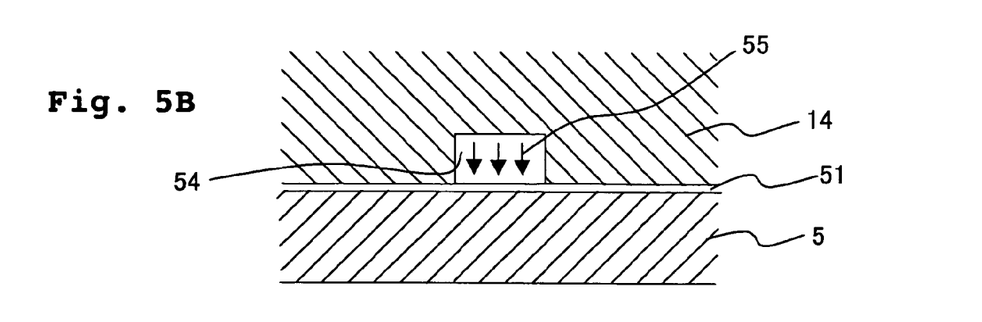
Figure 5C:
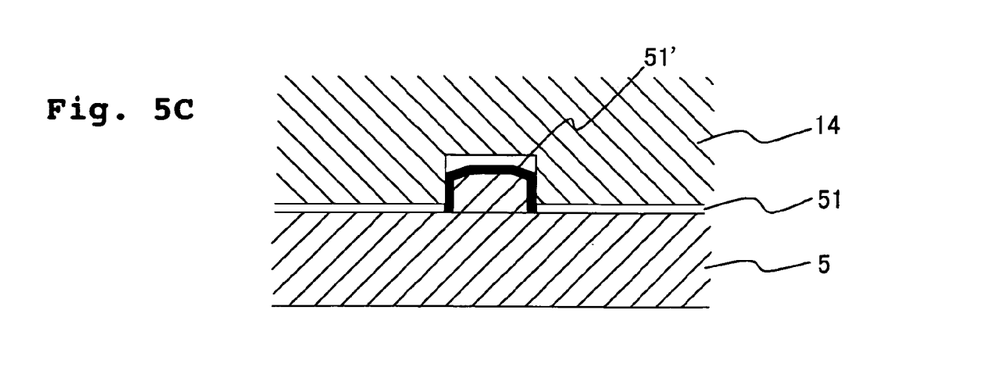

At first, as shown in FIG. 5A, inactive pressurized carbon dioxide 55' having a pressure P1=5 MPa was introduced to stay in the space defined by the polymer 5 to which the solute 51 had been applied beforehand and the stamper 14 on which the convex/concave pattern 53 was formed on the surface. After the pressure P1 of the pressurized carbon dioxide 55' was stabilized, this state was maintained for 1 minute. Subsequently, the press piston (13, see FIG. 1) was moved upwardly, and thus the surface of the polymer 5, to which the solute 51 had been applied, was allowed to make tight contact with the surface of the stamper 14 as shown in FIG. 5B. Accordingly, the recess 54 of the stamper 14 is in a closed state brought about by the polymer 5. The pressure in the recess 54 is suddenly increased. Accordingly, the pressurized carbon dioxide 55', which had stayed in the recess 54, was further pressurized to be in a supercritical state (supercritical carbon dioxide 55) to instantaneously improve the performance of the solvent for the polymer 5 and the function as the plasticizer. The press piston 13 was controlled such that the press piston 13 was moved by introducing the pressurized carbon dioxide 55' adjusted to have a pressure P2=10 MPa by the pressure-reducing unit 3, and the pressure was raised to a predetermined press pressure to maintain this state for 5 minutes thereafter. Accordingly, as shown in FIG. 5C, the softened polymer 5 flows into the recess 54 of the stamper 14, and the previously applied solute 51 is dissolved and permeated into the surface of the polymer 5 flown into the recess 54 (solute-permeated layer 51'). The solute 51, which is disposed on the surface of the polymer 5 at portions other than the portion flown into the recess 54, remains as the solute 51 is applied to the surface of the polymer 5, which is not permeated into the polymer 5.

Figure 5D:
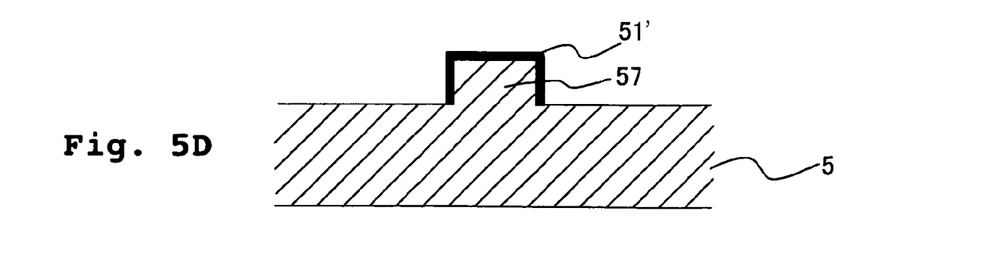

Subsequently, the release valve 32 shown in FIG. 1 was opened, and thus the space in the mold 1 was open to the atmospheric air. Further, the release valve 33 was opened, and thus the press pressure of the press piston 13 was reduced to move the press piston 13 backwardly. Subsequently, the formed polymer 5 was taken out from the mold 1. Further, the entire polymer 5 was ultrasonically washed for 10 minutes in a methanol solution. Accordingly, as shown in FIG. 5D, the polymer 5 composed of the polymethyl methacrylate resin can be obtained, wherein a concave/convex pattern 57, which corresponds to the concave/convex pattern 53 formed on the surface of the stamper 14, is formed on the surface of the polymer 5, simultaneously with which polyethylene glycol is permeated into only the surface of the convex portion, i.e., only the surface of the convex portion has been modified with polyethylene glycol.

The wettability of the surface of the obtained polymer 5 was confirmed by allowing water droplets to fall thereon in the vicinity of a circular convex portion (not shown) of the polymer 5 formed corresponding to the circular recess 14f (see FIG. 2) of the stamper 14. As a result, the contact angle of water of the surface portion not subjected to the surface-modifying treatment was about 55°, while the contact angle of water of the surface of the convex portion subjected to the surface-modifying treatment was about 10°. It has been revealed that the wettability is greatly improved partially. When the wettability was confirmed again after immersing the polymer after the treatment in water for 24 hours, the contact angle of water was scarcely changed. When the wettability of the treated portion was confirmed after leaving the polymer after the treatment in the atmospheric air for 1 month, the contact angle of water was 13°. It has been revealed that the good wettability is maintained for a certain period of time.

Third Embodiment

An explanation will be made with reference to FIGS. 1 and 6 about another method for selectively permeating a solute into only a part of the polymer surface. The method was carried out in the same manner as in the first embodiment described above principally except that the polymer and the stamper were allowed to make tight contact with each other before introducing the supercritical carbon dioxide into the mold.

Figure 6A:
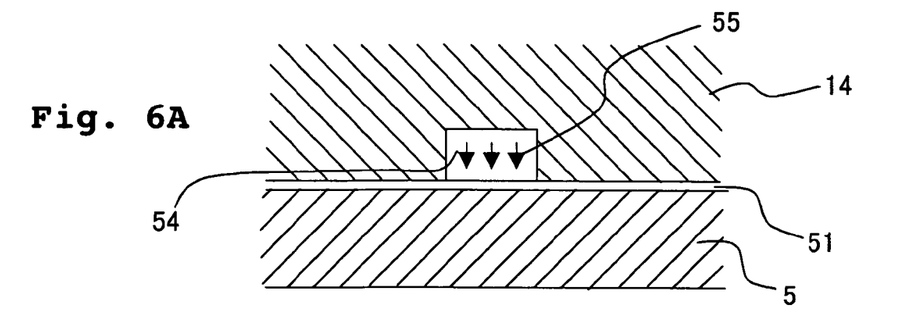
FIGS. 6A to 6D illustrate a method for modifying a polymer surface according to a third embodiment of the present invention.
Figure 6B:
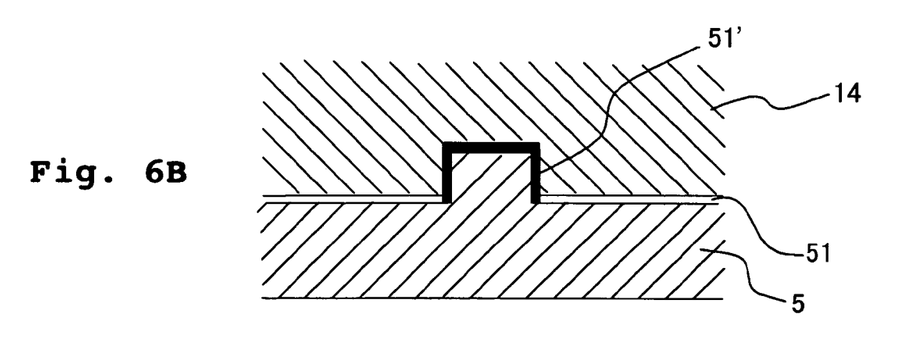

At first, as shown in FIG. 6A, the press piston (13, see FIG. 1) was moved upwardly, and the surface of the polymer 5, to which the solute 51 had been applied, was allowed to make tight contact with the surface of the stamper 14. Subsequently, the supercritical carbon dioxide 55, which was adjusted to have a pressure P1=20 MPa, was introduced to stay in the space defined by the polymer 5 and the recess 54 of the stamper 14. After the pressure P1 of the supercritical carbon dioxide 55 was stabilized, this state was maintained for 3 minutes. The softened polymer 5 flows into the recess 54 of the stamper 14 as shown in FIG. 6B, because the supercritical carbon dioxide stays in the recess 54 of the stamper 14. Further, the solute 51, which has been previously applied to the surface of the polymer 5 flown into the recess 54 of the stamper 14, is dissolved in the supercritical carbon dioxide to make permeation into the polymer 5 (solute-permeated layer 51'). On the contrary, the solute 51, which is disposed on the surface of the polymer at portions not flown into the recess 54, remains applied to the surface of the polymer 5, which is not permeated into the polymer 5.

Figure 6C:
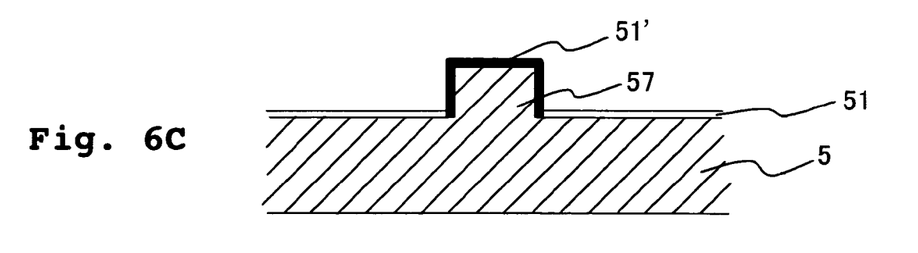
Figure 6D:
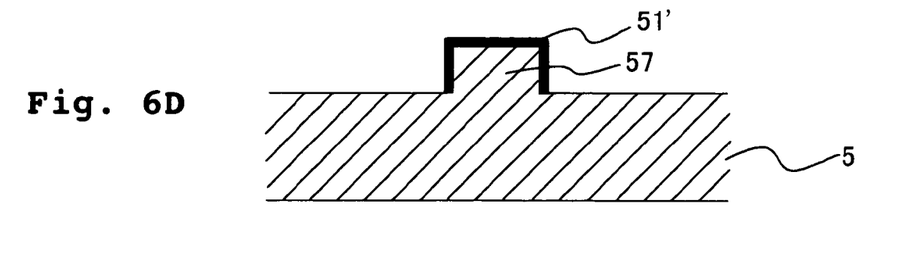

Subsequently, the release valve 32 shown in FIG. 1 was opened, and thus the space in the mold 1 was open to the atmospheric air. Further, the release valve 33 was opened, and thus the press pressure of the press piston 13 was reduced to move the press piston 13 backwardly. Subsequently, the formed polymer 5 was taken out from the mold 1 (FIG. 6C). Further, the entire polymer 5 was ultrasonically washed for 10 minutes in a methanol solution. Accordingly, as shown in FIG. 6D, the polymer 5 composed of the polymethyl methacrylate resin can be obtained, wherein a concave/convex pattern 57, which corresponds to the concave/convex pattern formed on the surface of the stamper 14, is formed on the surface of the polymer 5, simultaneously with which polyethylene glycol as the solute is permeated into only the surface of the convex portion, i.e., only the surface of the convex portion has been modified with polyethylene glycol.

The wettability of the surface of the obtained polymer 5 was confirmed by allowing water droplets to fall thereon in the vicinity of a circular convex portion (not shown) of the polymer 5 formed corresponding to the circular recess 14f (see FIG. 2) of the stamper 14. As a result, the contact angle of water of the surface portion not subjected to the surface-modifying treatment was about 58°, while the contact angle of water of the surface of the convex portion subjected to the surface-modifying treatment was about 10°. It has been revealed that the wettability is greatly improved partially. When the wettability was confirmed again after immersing the polymer after the treatment in water for 24 hours, the contact angle of water was scarcely changed. When the wettability of the treated portion was confirmed after leaving the polymer after the treatment in the atmospheric air for 1 month, the contact angle of water was about 12°. It has been revealed that the good wettability is maintained for a certain period of time.

In the embodiments described above, the shape of the mold is arbitrary. It is possible to use any mold employed, for example, for the conventional press forming. Arbitrary means may be used to maintain the tightly closed state of the mold after introducing the polymer or the supercritical fluid into the mold. However, it is possible to use, for example, a lid-sealing mechanism based on the bolt tightening or of the rotary type. It is also allowable to adopt, for example, a method in which the mold is attached to a press forming machine to seal the mating surfaces by the force of the press.

In the embodiments described above, the temperature of the mold is arbitrary. However, when the polymer is allowed to make contact with the supercritical fluid to permeate the solute applied to the polymer surface, it is desirable that the mold temperature is controlled to be a temperature which is lower by about 5 to 50° C. than the glass transition temperature of the polymer. The fine pattern on the stamper attached to the mold can be also transferred more reliably by pressure-reducing and releasing the supercritical fluid from the mold and raising the temperature of the mold to be not less than the glass transition temperature of the polymer. After that, the mold temperature may be lowered to cool the polymer, and then the polymer may be taken out from the mold.

In the embodiments described above, the supercritical fluid was used for the driving source of the press piston. However, it is also allowable to use any pressurized gas such as dry air and nitrogen. Alternatively, it is also allowable to use a press piston of the electric type or of the hydraulic type.

In the embodiments described above, the stamper was used to form the concave/convex pattern on the polymer surface. However, it is also allowable to directly use a mold having a concave/convex pattern formed on its surface, without using the stamper.

When the method for modifying the polymer surface according to the present invention is used, for example, it is possible to obtain the polymer having the surface modified, for example, partially to be hydrophilic, and the polymer product such as μ-TAS and the biochip based on the use of the polymer.

What is claimed is:

1. A method for modifying a surface of a polymer with a supercritical fluid, the method comprising:
   applying a solute to the surface of the polymer without using the supercritical fluid; and
   bringing the supercritical fluid into contact with only a part of the surface of the polymer to which the solute has been applied so that the solute exposed to a supercritical fluid is permeated into the surface of the polymer.

2. The method for modifying the surface of the polymer according to claim 1, wherein the polymer is subjected to press forming by using a mold while bringing the supercritical fluid into contact with the polymer surface.

3. The method for modifying the surface of the polymer according to claim 2, wherein a space, which is defined between the mold and the polymer before being pressed in the press forming, has a pressure which is lower than a pressure of the supercritical fluid, and a space, which is defined between the mold and the polymer after being pressed in the press forming, has a pressure which is not less than the pressure of the supercritical fluid.

4. The method for modifying the surface of the polymer according to claim 3, further comprising, after bringing the supercritical fluid into contact with the surface of the polymer to which the solute has been applied so that the solute is permeated into the surface of the polymer, washing the polymer surface with a solvent to remove solute that did not permeate into the polymer surface.

5. The method for modifying the surface of the polymer according to claim 2, wherein the supercritical fluid is flown into a space which is defined between the mold and the polymer after putting a surface of the mold into tight contact with the polymer surface in the press forming and the polymer is further pressed.

6. The method for modifying the surface of the polymer according to claim 5, further comprising, after bringing the supercritical fluid into contact with the surface of the polymer to which the solute has been applied so that the solute is permeated into the surface of the polymer, washing the polymer surface with a solvent to remove solute that did not permeate into the polymer surface.

7. The method for modifying the surface of the polymer according to claim 2, wherein a predetermined pattern is formed by the press forming on the polymer surface to which the solute has been applied.

8. The method for modifying the surface of the polymer according to claim 7, wherein a space, which is defined between the mold and the polymer before being pressed in the press forming, has a pressure which is lower than a pressure of the supercritical fluid, and a space, which is defined between the mold and the polymer after being pressed in the press forming, has a pressure which is not less than the pressure of the supercritical fluid.

9. The method for modifying the surface of the polymer according to claim 8, further comprising, after bringing the supercritical fluid into contact with the surface of the polymer to which the solute has been applied so that the solute is permeated into the surface of the polymer, washing the polymer surface with a solvent to remove solute that did not permeate into the polymer surface.

10. method for modifying the surface of the polymer according to claim 7, wherein the supercritical fluid is flown into a space which is defined between the mold and the polymer after putting a surface of the mold into tight contact with the polymer surface in the press forming and the polymer is further pressed.

11. The method for modifying the surface of the polymer according to claim 10, further comprising, after bringing the supercritical fluid into contact with the surface of the polymer to which the solute has been applied so that the solute is permeated into the surface of the polymer, washing the polymer surface with a solvent to remove solute that did not permeate into the polymer surface.

12. method for modifying the surface of the polymer according to claim 7, wherein a concave/convex pattern, which has a depth of not more than 100 μm, is provided on a surface of the mold.

13. method for modifying the surface of the polymer according to claim 1, wherein the supercritical fluid is carbon dioxide in a supercritical state.

14. method for modifying the surface of the polymer according to claim 13, wherein the supercritical fluid has a temperature of 35 to 150° C. and a pressure of 10 to 25 MPa.

15. method for modifying the surface of the polymer according to claim 1, wherein the polymer is polymethyl methacrylate.

16. method for modifying the surface of the polymer according to claim 1, wherein the solute is dissolvable in the supercritical fluid.

17. method for modifying the surface of the polymer according to claim 1, wherein the solute is polyethylene glycol.

18. method for modifying the surface of the polymer according to claim 1, wherein the solute, which is softened by being heated, is applied to the polymer surface.

19. A method for producing a polymer product by using a supercritical fluid, the method comprising:
   preparing a polymer;
   applying a solute to a surface of the polymer without using the supercritical fluid; and
   bringing the supercritical fluid into contact with only a part of the surface of the polymer to which the solute has been applied so that the solute exposed to a supercritical fluid is permeated into the surface of the polymer.

20. method for producing the polymer product according to claim 19, wherein the polymer is subjected to press forming by using a mold while bringing the supercritical fluid into contact with the polymer surface.

21. method for producing the polymer product according to claim 19, wherein the polymer product is a biochip or μ-TAS.

* * * * *

UNITED STATES PATENT AND TRADEMARK OFFICE
CERTIFICATE OF CORRECTION

PATENT NO. : 7,625,514 B2
APPLICATION NO. : 11/111822
DATED : December 1, 2009
INVENTOR(S) : Yusa et al.

It is certified that error appears in the above-identified patent and that said Letters Patent is hereby corrected as shown below:

Changes to Claims,

Claim 10, Line 1,
change "10. method for modifying the surface of the polymer" to --10. The method for modifying the surface of the polymer--.

Claim 12, Line 1,
change "12. method for modifying the surface of the polymer" to --12. The method for modifying the surface of the polymer--.

Claim 13, Line 1,
change "13. method for modifying the surface of the polymer" to --13. The method for modifying the surface of the polymer--.

Claim 14, Line 1,
change "14. method for modifying the surface of the polymer" to --14. The method for modifying the surface of the polymer--.

Claim 15, Line 1,
change "15. method for modifying the surface of the polymer" to --15. The method for modifying the surface of the polymer--.

Claim 16, Line 1,
change "16. method for modifying the surface of the polymer" to --16. The method for modifying the surface of the polymer--.

Claim 17, Line 1,
change "17. method for modifying the surface of the polymer" to --17. The method for modifying the surface of the polymer--.

Claim 18, Line 1,
change "18. method for modifying the surface of the polymer" to --18. The method for modifying the surface of the polymer--.

CERTIFICATE OF CORRECTION (continued)
U.S. Pat. No. 7,625,514 B2

Changes to Claims,

Claim 20, Line 1,
change "20. method for producing the polymer product according to" to --20. The method for producing the polymer product according to--.

Claim 21, Line 1,
change "21. method for producing the polymer product according to" to --21. The method for producing the polymer product according to--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,625,514 B2
APPLICATION NO. : 11/111822
DATED : December 1, 2009
INVENTOR(S) : Yusa et al.

It is certified that error appears in the above-identified patent and that said Letters Patent is hereby corrected as shown below:

Changes to Claims,

Column 14, Claim 10, Line 5,
change "10. method for modifying the surface of the polymer" to --10. The method for modifying the surface of the polymer--.

Column 14, Claim 12, Line 18,
change "12. method for modifying the surface of the polymer" to --12. The method for modifying the surface of the polymer--.

Column 14, Claim 13, Line 22,
change "13. method for modifying the surface of the polymer" to --13. The method for modifying the surface of the polymer--.

Column 14, Claim 14, Line 25,
change "14. method for modifying the surface of the polymer" to --14. The method for modifying the surface of the polymer--.

Column 14, Claim 15, Line 28,
change "15. method for modifying the surface of the polymer" to --15. The method for modifying the surface of the polymer--.

Column 14, Claim 16, Line 31,
change "16. method for modifying the surface of the polymer" to --16. The method for modifying the surface of the polymer--.

Column 14, Claim 17, Line 34,
change "17. method for modifying the surface of the polymer" to --17. The method for modifying the surface of the polymer--.

Column 14, Claim 18, Line 37,
change "18. method for modifying the surface of the polymer" to --18. The method for modifying the surface of the polymer--.

CERTIFICATE OF CORRECTION (continued)
U.S. Pat. No. 7,625,514 B2

Changes to Claims,

Column 14, Claim 20, Line 49,
change "20. method for producing the polymer product according to" to --20. The method for producing the polymer product according to--.

Column 14, Claim 21, Line 53,
change "21. method for producing the polymer product according to" to --21. The method for producing the polymer product according to--.

This certificate supersedes the Certificate of Correction issued March 16, 2010.

Signed and Sealed this

Sixth Day of April, 2010

David J. Kappos
*Director of the United States Patent and Trademark Office*